United States Patent [19]

Eckstein

[11] Patent Number: 5,330,103
[45] Date of Patent: Jul. 19, 1994

[54] REVERSING ROTARY DRIVE SPRINKLER

[75] Inventor: Gershon Eckstein, San Diego, Calif.

[73] Assignee: Pepco Water Conservaton Products, Inc., Fresno, Calif.

[21] Appl. No.: 42,472

[22] Filed: Apr. 2, 1993

[51] Int. Cl.⁵ .............................................. B05B 3/16
[52] U.S. Cl. ..................................... 239/242; 239/240
[58] Field of Search .......................... 239/237, 240–242

[56] References Cited

U.S. PATENT DOCUMENTS

| | | |
|---|---|---|
| 2,261,104 | 11/1941 | Birkigt . |
| 2,393,091 | 1/1946 | DeLacy-Mulhall ................ 239/242 |
| 3,081,164 | 3/1963 | Duer . |
| 3,304,804 | 2/1967 | Oldfield et al. . |
| 3,464,632 | 9/1969 | Bristow . |
| 3,645,451 | 2/1972 | Hauser ............................... 239/242 |
| 3,646,834 | 3/1972 | Davis . |
| 3,724,757 | 4/1973 | Hunter ............................... 239/205 |
| 4,043,226 | 8/1977 | Buuck . |
| 4,244,524 | 1/1981 | Wellings . |
| 4,253,608 | 3/1981 | Hunter . |
| 4,255,987 | 3/1981 | Ciolli . |
| 4,417,691 | 11/1983 | Lockwood . |
| 4,568,024 | 2/1986 | Hunter . |
| 4,621,541 | 11/1986 | Takahashi . |
| 4,624,412 | 11/1986 | Hunter . |
| 4,625,914 | 12/1986 | Sexton et al. . |
| 4,634,052 | 1/1987 | Grizzle et al. . |
| 4,718,605 | 1/1988 | Hunter . |
| 4,784,325 | 11/1988 | Walker et al. . |
| 4,787,558 | 11/1988 | Sexton et al. . |
| 4,850,247 | 7/1989 | Yu . |
| 4,892,252 | 1/1990 | Bruninga ............................ 239/240 |
| 4,948,052 | 8/1990 | Hunter . |
| 4,955,542 | 9/1990 | Kah, Jr. . |
| 5,031,833 | 7/1991 | Alkalay et al. . |
| 5,174,501 | 12/1992 | Hadar ................................. 239/242 |

FOREIGN PATENT DOCUMENTS 0004954 10/1979 European Pat. Off. .

Primary Examiner—Karen B. Merritt
Attorney, Agent, or Firm—Edward B. Anderson

[57] ABSTRACT

The epicyclic gear train for the sprinkler includes a sun gear coupled to an impeller for rotation about a central axis. A planetary gear has a single set of teeth meshing with the teeth of the sun gear for revolving about the central axis while pivoting about a revolving planetary gear axis. A first ring gear is fixed relative to the sprinkler housing and has teeth meshing with the teeth of the planetary gear. Second and third ring gears are adjacent to the first ring gear and rotate about the central axis. The respective teeth of the second and third ring gears mesh with the planetary gear teeth. There is one less tooth on the second ring gear than on the first ring gear, and one more tooth on the third ring gear than on the first ring gear. As a result, the second and third ring gears rotate in opposite directions relative to the first ring gear. The second and third ring gears each have an outer surface with a plurality of protrusions spaced around the circumference. A drive pin is mounted to the sprinkler spray head adjacent to the outer surfaces of the second and third ring gears. The drive pin is rotatable between a first position in which it contacts a protrusion of the second ring gear without contacting the protrusion of the third ring gear, and a second position in which it contacts a protrusion of the third ring gear without contacting the protrusion of the second ring gear. The rotational drive force of the ring gear having the contacted protrusion is transferred through the drive pin to the spray head.

17 Claims, 9 Drawing Sheets

REVERSING ROTARY DRIVE SPRINKLER

BACKGROUND OF THE INVENTION

1. Field of the Invention

This invention relates generally to irrigation water sprinklers of the type having a rotatable sprinkler spray head. More specifically, this invention relates to such sprinklers having oppositely rotating sprinkler head drive elements and a mechanism for selectively driving the sprinkler head alternately by the drive elements to produce oscillating rotation.

2. Related Art

Rotary sprinklers are typically driven in rotation by the force of water exiting a spray head or by an impeller inside the sprinkler through which water passes. In the latter case, the impeller rotates at a higher speed than the spray head. The impeller then is used to drive a speed reducing transmission that in turn drives the spray head.

Typical sprinkler drive systems thus include a rotating shaft that rotates the spray head. This is effective for rotating the spray head continuously in one direction. However, where it is desired to have the spray head oscillate through a defined arc of less than 360°, it is necessary to be able to reverse the direction of rotation of the spray head.

One method that has been used for doing this is to use a gear rotating on a shaft, which gear drives two different gear trains, all supported on a single plate. Typically a yoke assembly supporting the gear trains is shiftable for alternately engaging a terminal gear from each drive train with a gear driving the spray head. An example of such construction is disclosed in U.S. Pat. No. 4,568,024 issued to Hunter.

It has been found that substantial force is required to disengage a terminal gear and shift to the opposite direction. It is therefore desirable to have a sprinkler transmission that provides drive off of a large radius drive gear, such as a ring gear, to reduce the force applied to teeth of the drive gear. Further, it is desirable to have a sprinkler transmission that provides oppositely rotating elements that may be engaged alternatingly to drive the spray head in reciprocal directions.

SUMMARY OF THE INVENTION

These features are provided in the present invention by a transmission that applies the spray head drive force directly from a ring gear. The present invention also provides for the counterrotation of drive gears selectively engageable for driving the spray head in opposite directions.

In one aspect of the invention, a rotary drive sprinkler comprises a sprinkler housing adapted for connection to a supply of irrigation water, and a spray head supported for rotation relative to the housing for outward projection of an irrigation water stream. A rotary drive assembly rotates the spray head. A reversing mechanism reverses the direction of spray head rotation within the end limits of a part-circle arcuate path. This reversing mechanism includes a drive member coupled to the spray head. First and second drive elements are rotated in opposite directions by the rotary drive assembly. The drive member is selectively coupled to one of the first and second drive elements for carrying the drive member in rotation with the one drive element, and thereby, rotating the spray head. Thus, rotation in opposite directions is effected by changing the coupling between the spray head and the drive elements, thereby allowing the transmission to be driven continuously without any changes in direction between gears.

In another aspect of the invention, the sprinkler includes an impeller mounted relative to the housing for rotation by the flow of water in the housing. A planetary gear is coupled to the impeller for revolving about a central axis while pivoting about a planetary gear axis. A first ring gear is fixed relative to the sprinkler housing and has teeth meshing with teeth of the planetary gear. Also, a second ring gear rotates about the central axis and has teeth meshing with planetary gear teeth. The second ring gear is drivingly coupled to said spray head for rotating the spray head about the central axis. In this way, the driving force is applied to the spray head via a larger radius gear than is a wheel gear, thereby reducing the torque on the gear teeth and allowing easier shifting of direction.

In the preferred embodiment of the invention, the rotary drive sprinkler comprises an epicyclic gear train including a sun gear coupled to an impeller for rotation about a central axis. A planetary gear has a single set of teeth meshing with the teeth of the sun gear for revolving about the central axis while pivoting about a revolving planetary gear axis. A first ring gear is fixed relative to the sprinkler housing and has teeth meshing with the teeth of the planetary gear. Second and third ring gears are adjacent to the first ring gear and rotate about the central axis. The respective teeth of the second and third ring gears mesh with the planetary gear teeth. There is one less tooth on the second ring gear than on the first ring gear, and one more tooth on the third ring gear than on the first ring gear. As a result, the second and third ring gears rotate in opposite directions relative to the first ring gear. The second and third ring gears each have an outer surface with a plurality of protrusions spaced around the circumference.

A drive pin is mounted to the spray head adjacent to the outer surfaces of the second and third ring gears. The drive pin is rotatable between a first position in which it contacts a protrusion of the second ring gear without contacting the protrusion of the third ring gear, and a second position in which it contacts a protrusion of the third ring gear without contacting the protrusion of the second ring gear. The rotational drive force of the ring gear having the contacted protrusion is transferred through the drive pin to the spray head. A spring-biased yoke is shiftable between two positions for rotating the drive pin between the first and second positions.

Two stops exist for shifting the yoke between the two positions. One of the two stops is fixed relative to the sprinkler housing and the other of the two stops is movable relative to the sprinkler housing for varying the length of the arc the spray head travels. The movable stop is manually adjustable for varying the arc length.

This sprinkler thus provides the necessary speed reduction through the use of a planetary/sun gear transmission, with the final spray head drive and gear reduction provided by the use of counterrotating ring gears driven by a planetary gear tracking the teeth of a fixed ring gear. Reversing direction of spray head travel is then a matter of changing the ring gear it is coupled to. Further, spray head movement is controlled by continuously moving transmission gears that are always engaged.

These and other features and advantages of the present invention will be apparent from the following detailed description of the preferred embodiment of the invention, described for purposes of illustration but not limitation, and as illustrated in the accompanying drawings.

DETAILED DESCRIPTION OF THE PREFERRED EMBODIMENT

Figure 1:
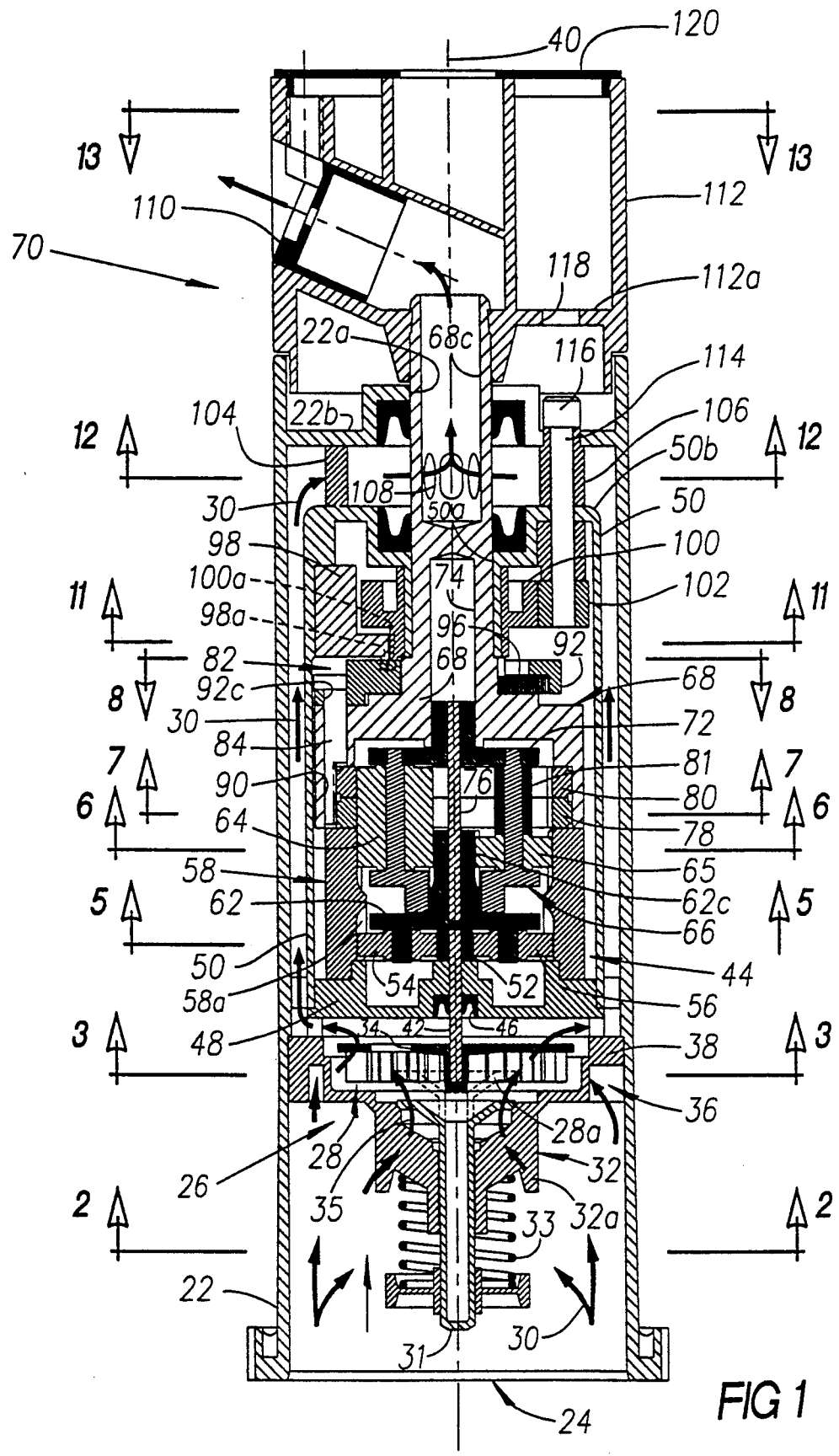
FIG. 1 is a longitudinal cross section of a rotary drive sprinkler made according to the invention.

Referring initially to FIG. 1, a rotary drive sprinkler, shown generally at 20, includes a generally cylindrical housing 22. An inlet opening 24 at the bottom of the housing is connectable to a source of water such as a fixed water line or the like. Sprinkler 20 includes a drive motor 26, such as water turbine, having an impeller 28. The movement of water through housing 22 along a water path is illustrated by the arrows 30.

Figure 3:
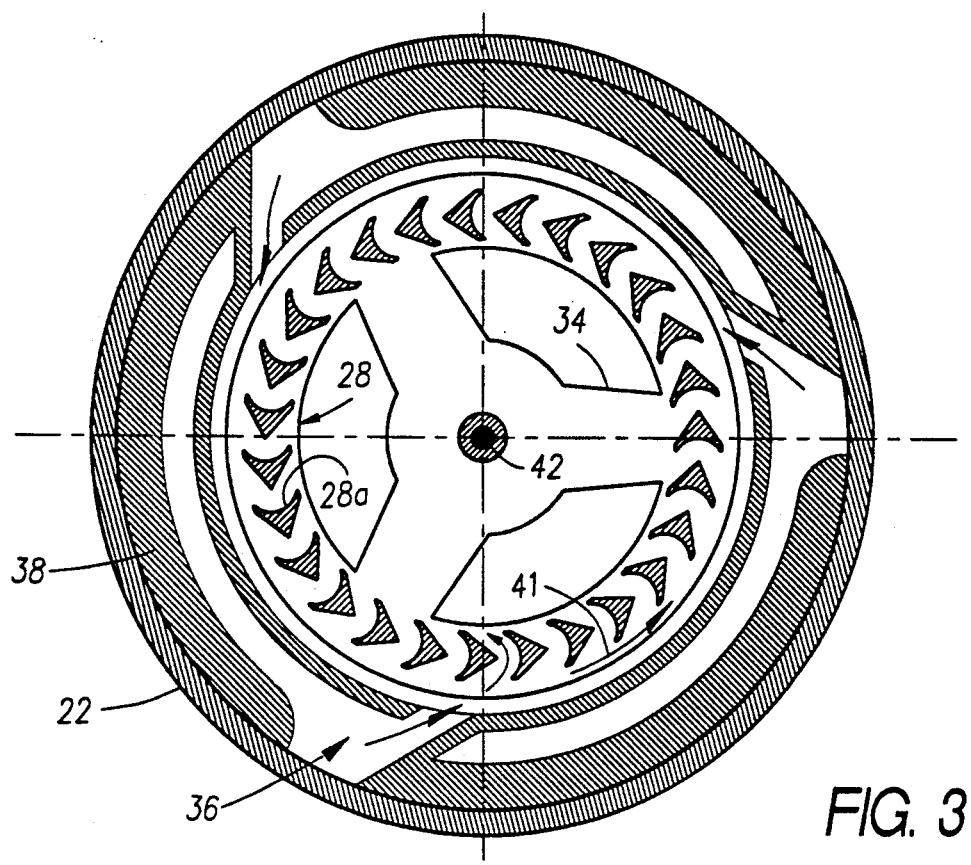
FIG. 3 is a transverse cross section taken along line 3—3 in FIG. 1.
Figure 2:
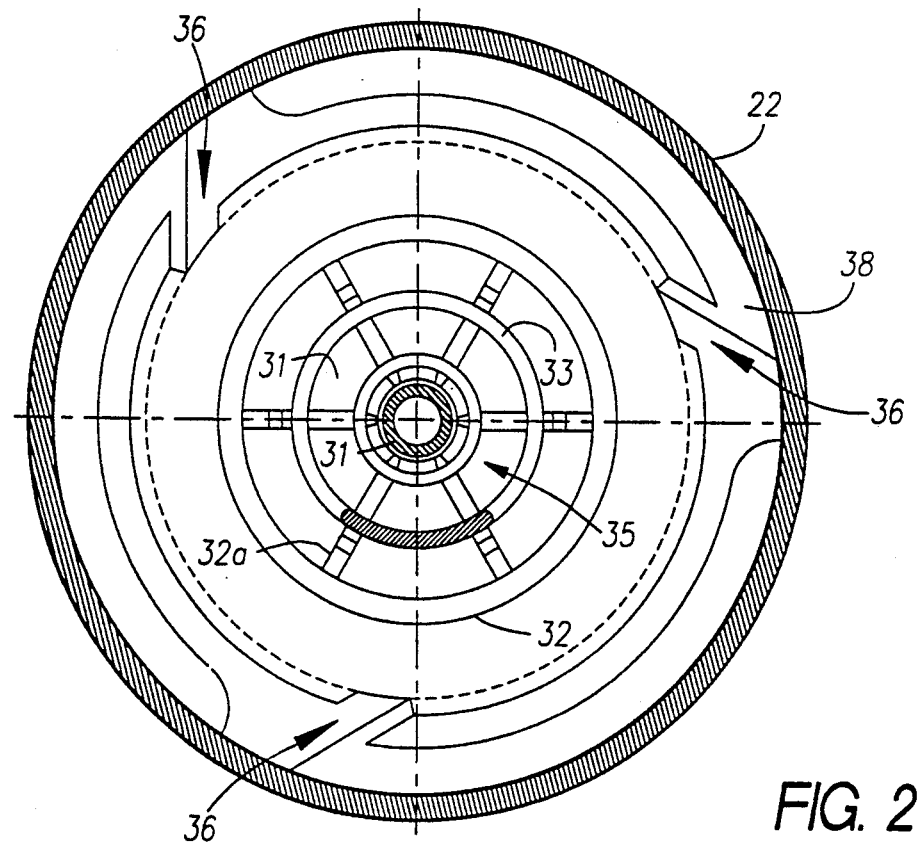
FIG. 2 is a transverse cross section taken along line 2—2 in FIG. 1.

At higher water flow conditions, the water is directed into impeller 28 between fins 32a of a guide element 32, as shown in FIG. 2. A valve 31, urged downwardly by a spring 33, is forced upwardly, as illustrated by the dashed lines, allowing water to pass through a central opening 35 in a water-directing plate 38. Three openings 34 in impeller 28 allow most of the water to travel directly upwardly through the impeller without passing between blades 28a of the impeller, as shown particularly in FIG. 3.

The impeller is drivingly rotated by water passing through channels 36 in plate 38. Water exiting from channels 36 is directed against the curved faces of impeller blades 28a, causing the impeller to rotate in a counterclockwise direction about a central axis 40, as shown by arrow 41 in FIG. 3. Impeller 28 is fixedly attached to a shaft 42 that drives a speed reducing transmission 44. During low water flow conditions, spring 33 lowers valve 31, closing opening 35, and thereby forcing water through channels 36 to drive the impeller.

Figure 4:
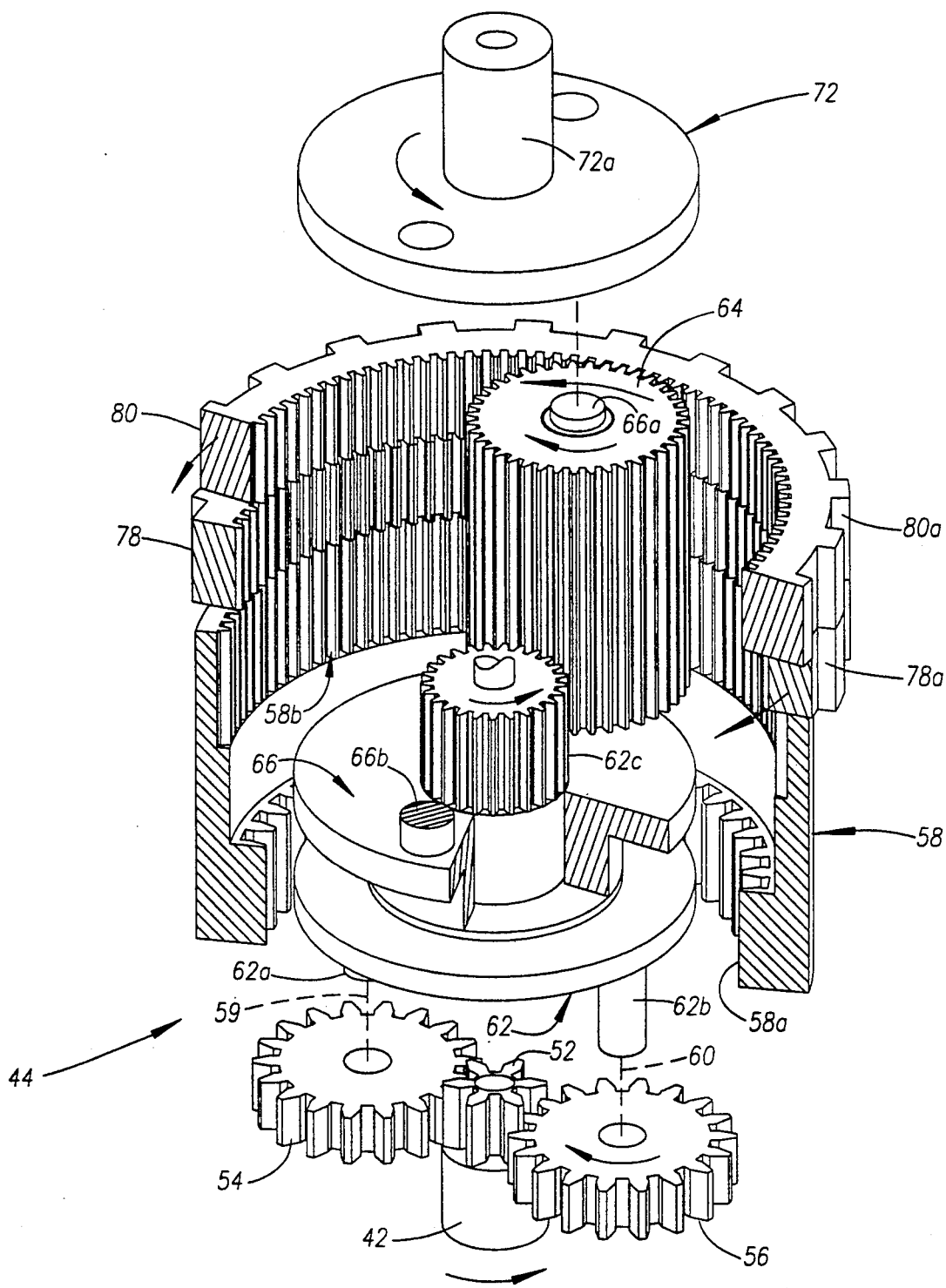
FIG. 4 is a partial fragmentary exploded view of the transmission of the sprinkler of FIG. 1.
Figure 6:
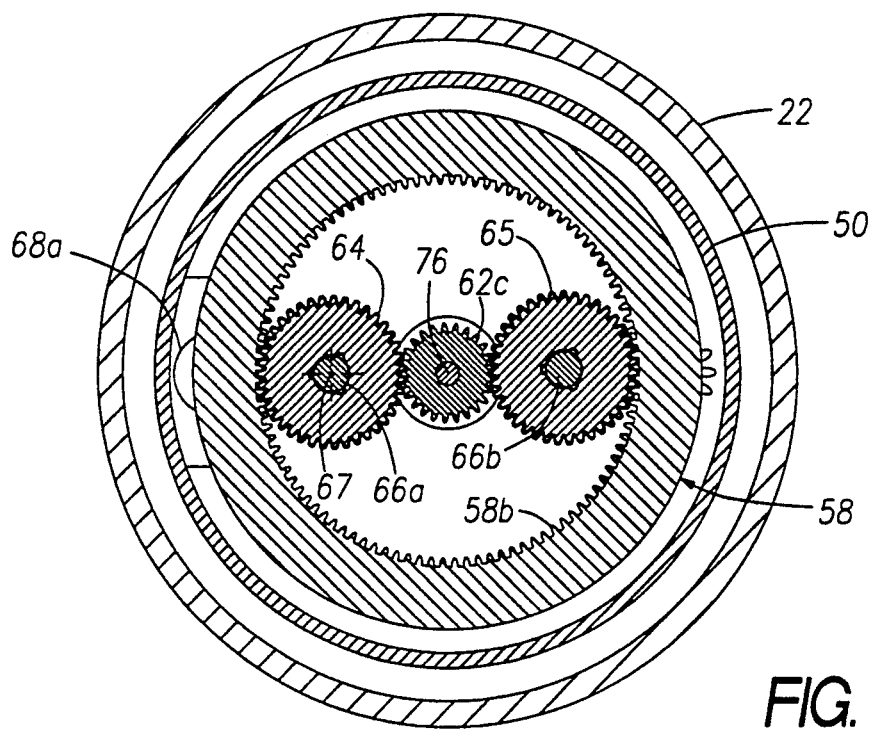
FIG. 6 is a transverse cross section taken along line 6—6 in FIG. 1.
Figure 5:
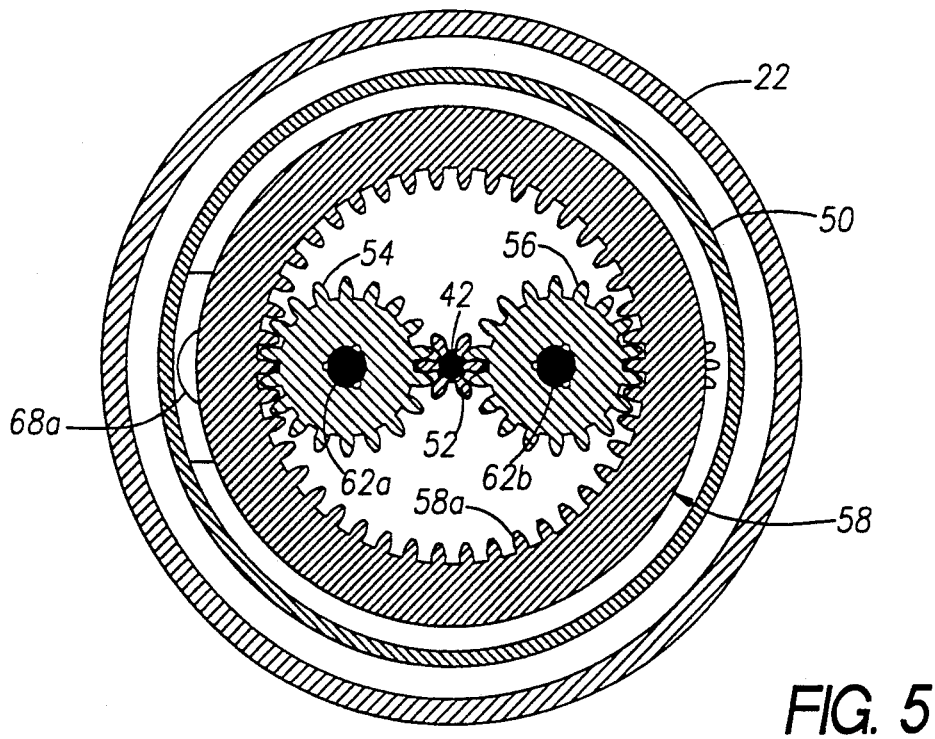
FIG. 5 is a transverse cross section taken along line 5—5 in FIG. 1.

Transmission 44 is sealed at the lower end by a seal 46 around shaft 42 where it passes through a transmission end plate 48 attached to the lower end of a transmission housing 50. Transmission housing 50 is spaced inwardly from sprinkler housing 22 to allow water to flow along water path 30 around the transmission. Shaft 42 is fixed at its upper end to a lower sun gear 52. Gear 52 drives rotatingly associated planetary gears 54 and 56, that are contained by a lower ring gear 58a formed in a cylinder 58, as is shown particularly in FIGS. 4 and 5. Gears 54 and 56 rotate about respective axes 59 and 60 that in turn revolve around central axis 40.

Planetary gears 54 and 56 are carried by a carrier plate 62 having subtending shaft portions 62a and 62b. The revolving of gears 54 and 56 about axis 40 results in carrier plate 62 also rotating about the central axis. The upper end of carrier plate 62 is formed as an upper sun gear 62c. This upper sun gear drives upper planetary gears 64 and 65 that ride in an upper ring gear 58b formed in cylinder 58. Gears 64 and 65 are carried rotatably on respective shafts 66a and 66b of an intermediate carrier plate 66, with gear 64 rotating about an axis 67.

A spray head base 68 of a spray head 70 is mounted for rotation on the top surface of cylinder 58 and inside transmission housing 50, as shown. An upper carrier plate 72 is attached to the upper ends of shafts 66a and 66b, and has an upwardly extending shaft 72a rotatable in a bore 74 in base 68. Carrier plates 66 and 72 are attached fixedly and rotatably, respectively, to a central shaft 76. It is seen that planetary gear 64 extends above cylinder 58 sufficiently to engage lower and upper counterrotating ring gears 78 and 80. A non-gear spacer 81 extends between planetary gear 65, which gear only engages ring gear 58b, and upper carrier plate 72.

Figure 7:
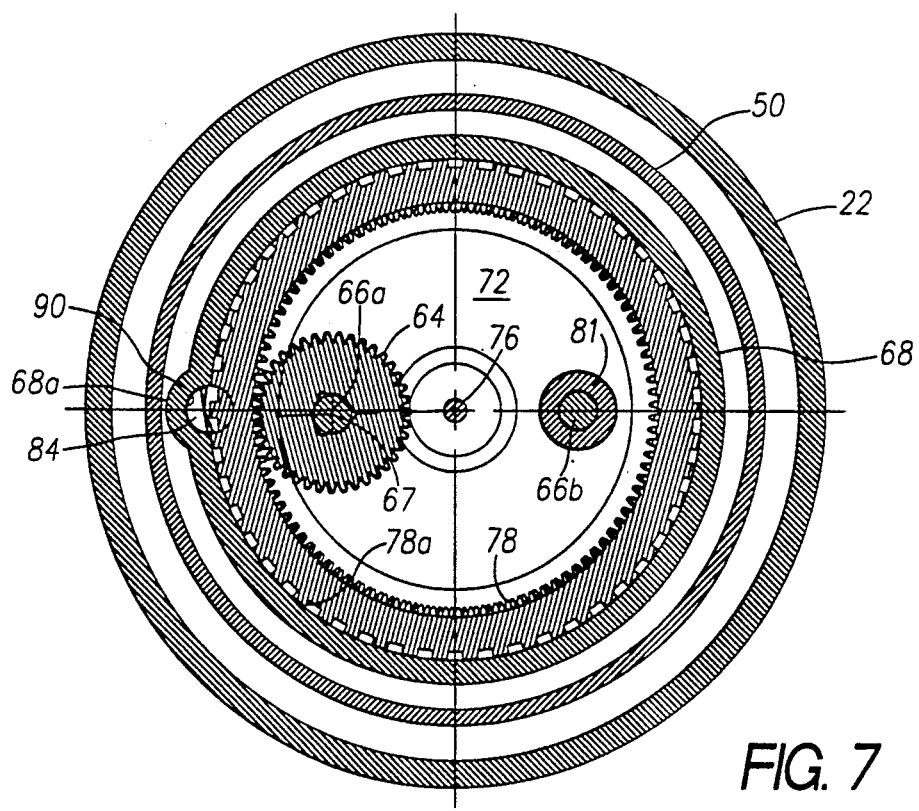
FIG. 7 is a transverse cross section taken along line 7—7 in FIG. 1.

Gear 64 thus engages all three ring gears 58b, 78 and 80 simultaneously. The teeth in the various gears are preferably selected to provide a 1:8 speed reduction between lower sun gear 52 and upper sun gear 62c, a 1:5 speed reduction between the upper sun gear and the revolution of planetary gear 64, and nominally a 1:100 reduction between the revolution of planetary gear 64 and each of rotatable ring gears 78 and 80. This last gear reduction is provided by having 100 teeth in upper fixed ring gear 58b, 99 teeth in lower counterrotating ring gear 78, and 101 teeth in upper counterrotating ring gear 80. Thus, for each revolution of planetary gear 64, ring gear 78 moves in a clockwise direction, as viewed from above (or in a counterclockwise direction as viewed from below, as shown in FIG. 7), by the width of one tooth, and similarly, gear 65 moves clockwise, as viewed from below, the width of one tooth. Gears 78 and 80 thus rotate in opposite directions, as illustrated by the arrows in FIG. 4, during the continuous running of transmission 44. There is thus a total reduction of about 1:4000.

Figure 8A:
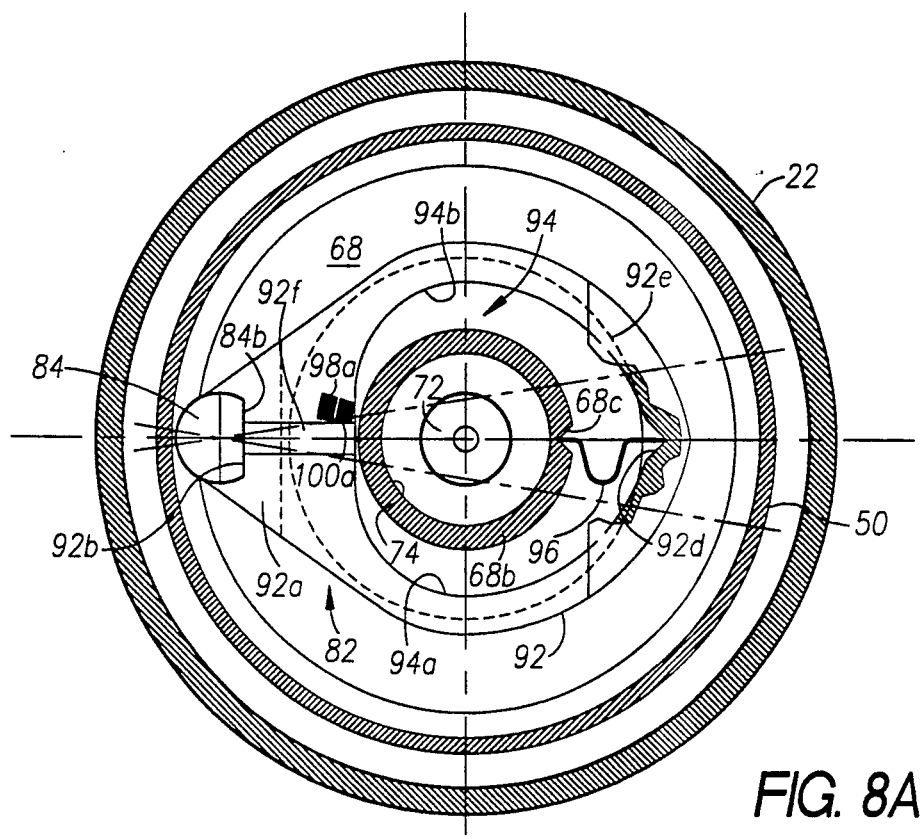
FIG. 8A is a transverse cross section taken along line 8—8 in FIG. 1.
Figure 8C:
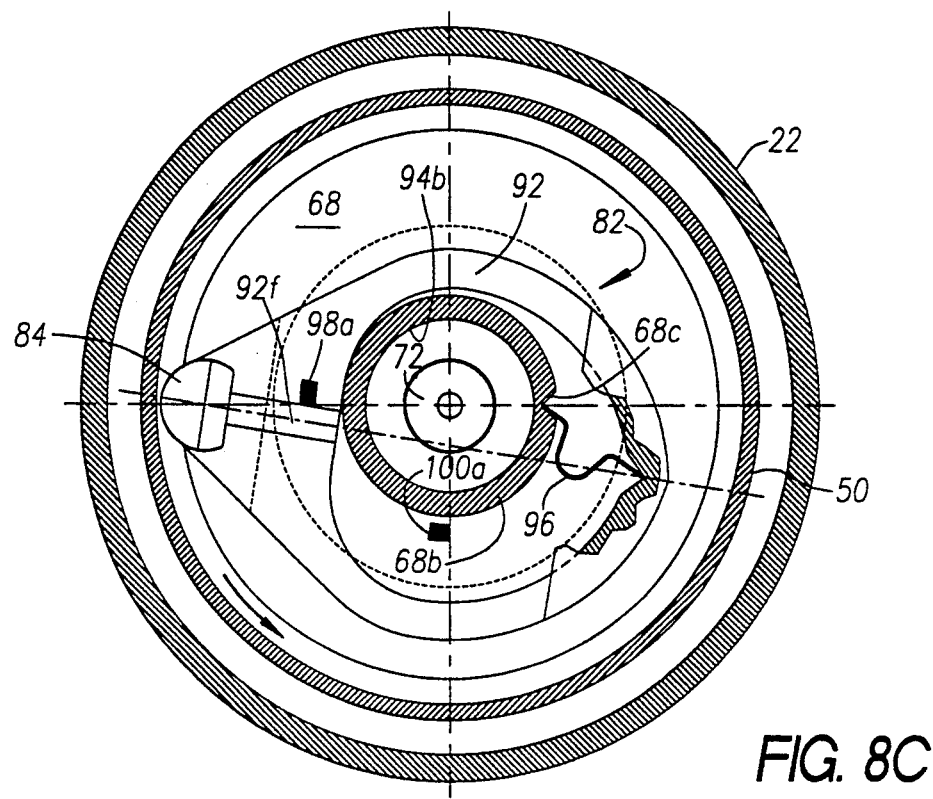
FIGS. 8B and 8C are views similar to FIG. 8A showing two operative positions of a direction-selecting yoke.
Figure 8B:
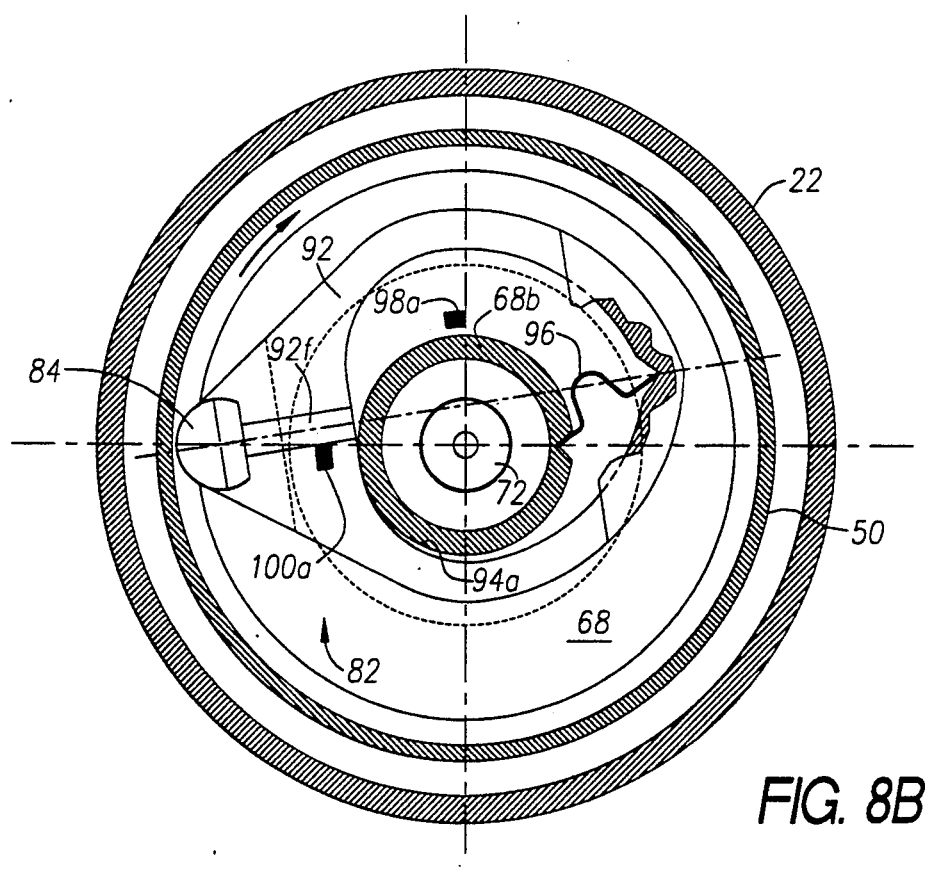
Figure 9:
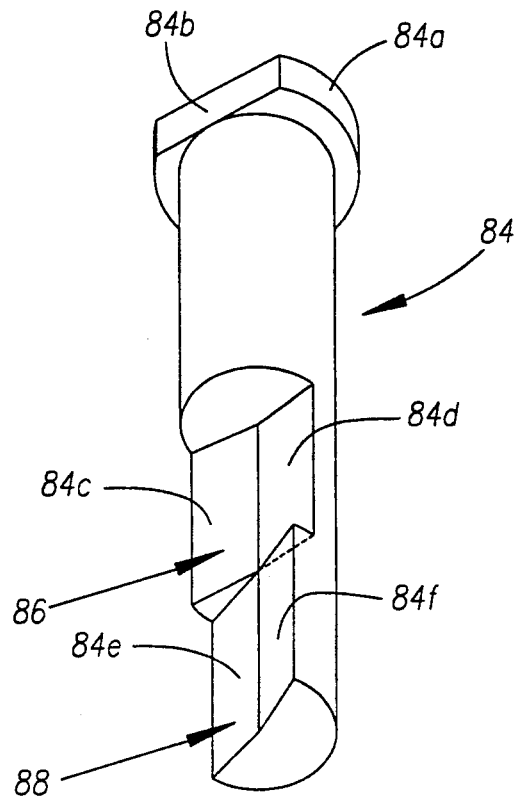
FIG. 9 is an isometric of a drive pin controlled by the yoke of FIG. 8 for selectively engaging each of two counterrotating ring gears in the sprinkler of FIG. 1.
Figure 10A:
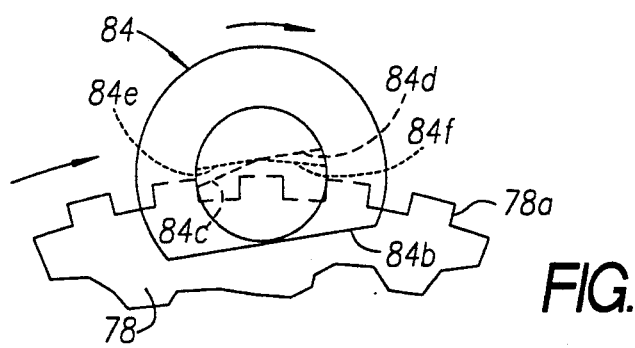
FIGS. 10A and 10B are top views of the drive pin of FIG. 9 showing two operative positions.
Figure 10B:
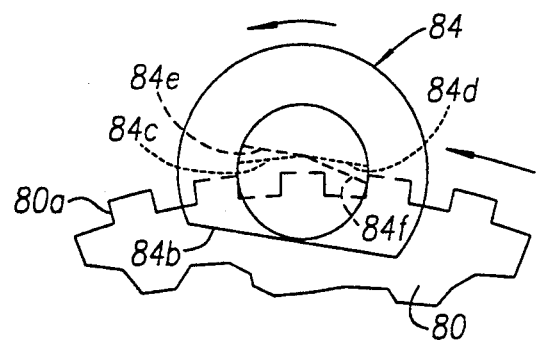

Ring gears 78 and 80 are alternatingly coupled to spray head 70 by a reversing mechanism 82 shown particularly in FIGS. 8A-8C. Mechanism 82 includes a drive pin 84 shown in isometric view in FIG. 9. Pin 84 is generally cylindrical with a top flange 84a having a flat edge 84b. At the lower end are two angled cutaways 86 and 88 formed by respective sets of obtuse-angled faces 84c and 84d, and 84e and 84f. The sets are misaligned as shown in FIGS. 10A and 10B which show top views of pin 84.

Protrusions or bosses 78a and 80a are distributed about the full circumferences of the outer surfaces of ring gears 78 and 80, respectively. Pin 84 is positioned in a bore 90 accommodated for by a bulge 68a in the side of base 68. A shiftable yoke 92 surrounds a shaft 68b in base 68. An opening 94 in the yoke through which shaft 68b extends has side lobes 94a and 94b sized to conform with shaft 68b, as shown in FIGS. 8B and 8C.

An extension 92a in the yoke encompasses the top of pin 84, and in particular includes a bore 92c accommodating the pin and a face 92b mating with flat edge 84b of the pin so that the pin cannot turn relative to the yoke. Opposite from extension 92a is an indentation 92d having an upper cover plate 92e. An indentation 68c in shaft 68b faces indentation 92d. Extending between these two indentations is a curved leaf spring 96, shown in FIG. 8A in an intermediate position with shaft 68b in between lobes 94a and 94b in opening 94. This is actually not a normal rest position for yoke 92 and spring 96, but is shown for convenience of illustration.

Figure 11A:
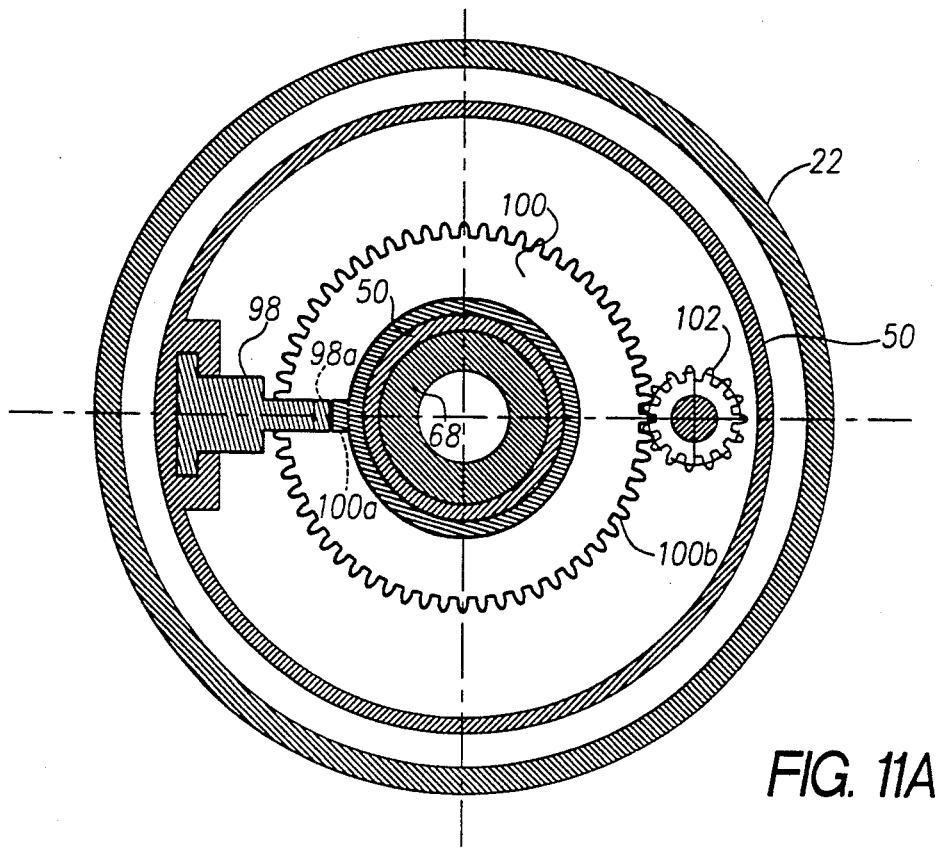
FIG. 11A is a transverse cross section taken along line 11—11 in FIG. 1.
Figure 11B:
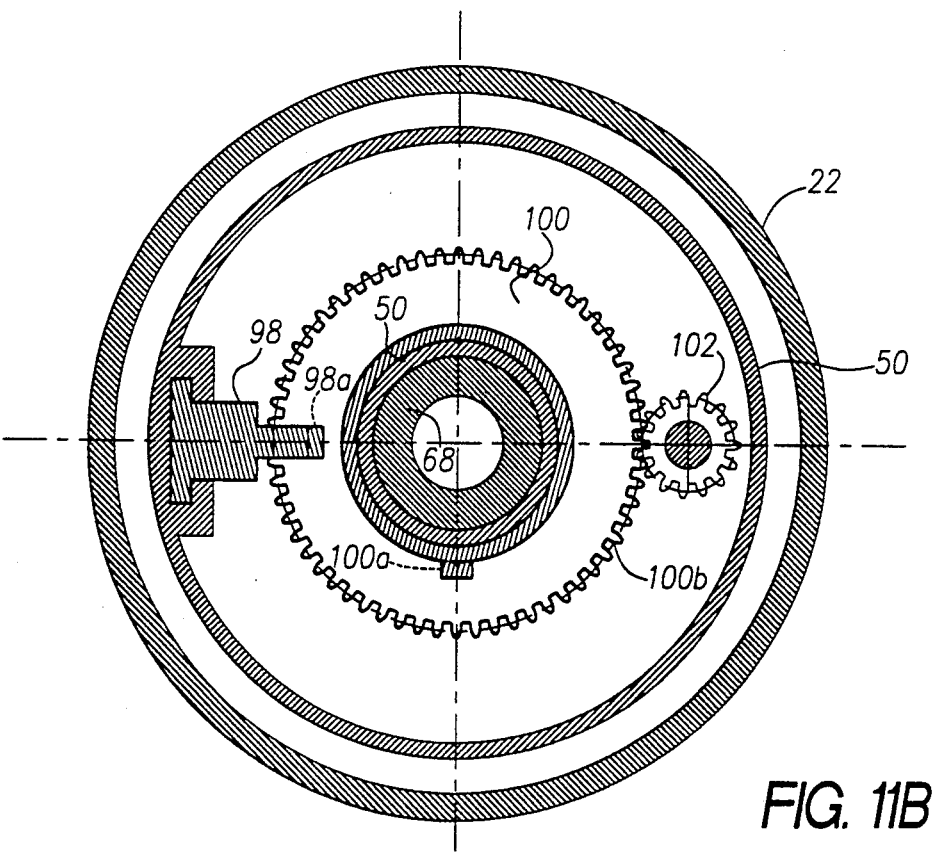
FIG. 11B is a view similar to FIG. 11B showing the setting of stops for a partial circle sprinkler arc.
Figure 13:
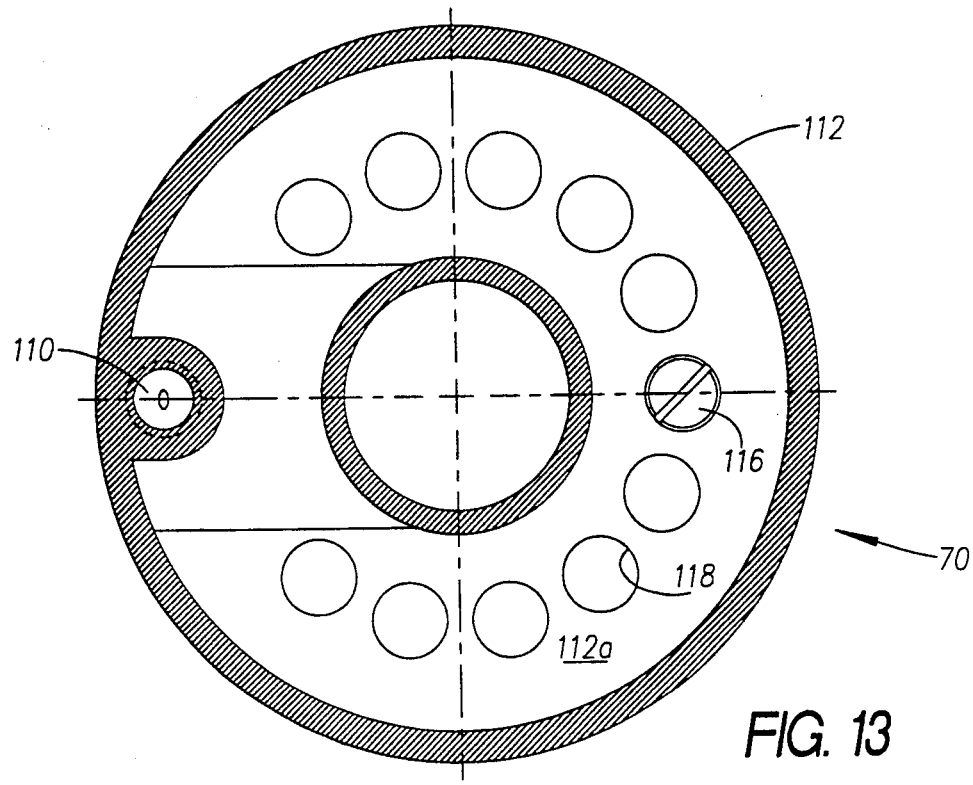
FIG. 13 is a transverse cross section taken along line 13—13 in FIG. 1.
Figure 12:
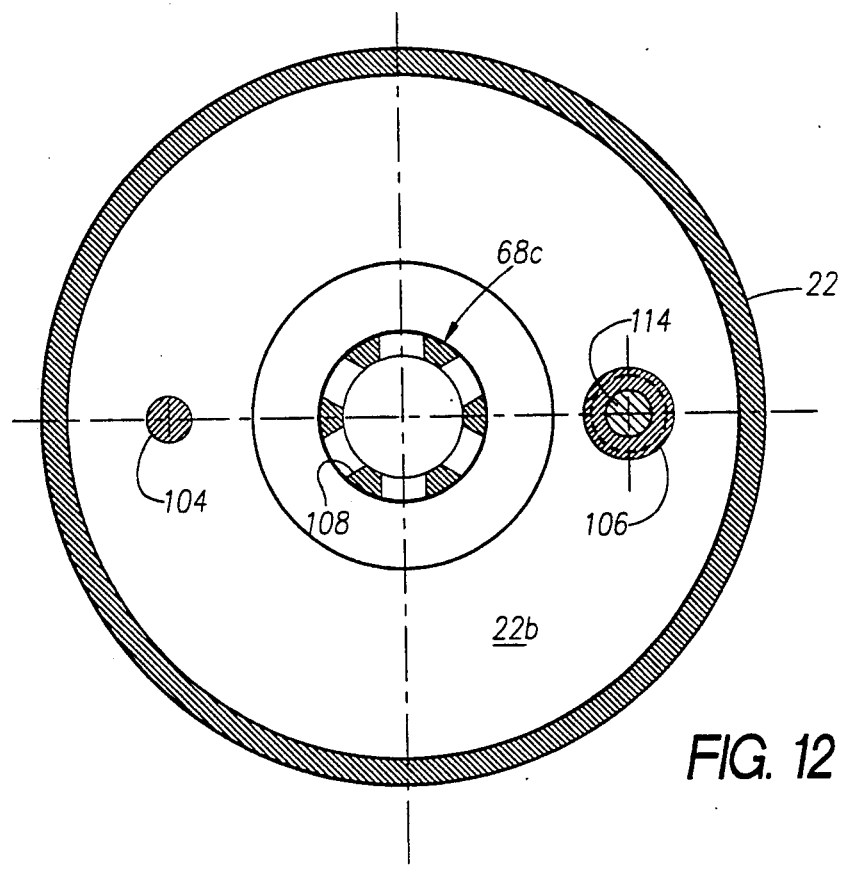
FIG. 12 is a transverse cross section taken along line 12—12 in FIG. 1.

A ridge 92f extends from opening 94, between lobes 94a and 94b, toward face 92b. This ridge serves as a contact structure for a pair of arc-limiting stops 98a and 100a of a block 98 and a ring 100. Block 98 is fixedly attached to the side wall of housing 50, making stop 98a fixed in radial position about axis 40. This is shown more clearly in FIGS. 11A and 11B. Ring 100 surrounds and is rotatable relative to shaft 68b, and has an outer surface with teeth 100b engaged by a reduced-diameter adjustment gear 102 positioned adjacent to the wall of housing 50. Gear 102 can be manually rotated, as is described below, for varying the radial position of stop 100a. FIG. 11A shows the two stops radially aligned. This position allows for a near −360° arc travel of the spray head between direction reversals. FIG. 11B shows stop 100a rotated clockwise 270° from the position shown in FIG. 11A, resulting in a spray head travel arc of 90°. If the stop had been rotated counterclockwise 90° to the same position, then there would be a travel arc of 270°.

The structure of sprinkler 20 could be modified to provide for the adjustment of stop 98a as well. This could be accomplished by replacing block 98 with a second ring surrounding ring 100. It would have teeth engaged by an adjustment gear like gear 102 that is manually adjusted the same way. Housing 50 would have to be constructed to accommodate and support this second ring.

Returning again to FIGS. 8B and 8C, the positions of yoke 92 and pin 84 at respective ends of the 90° arcs of travel corresponding to the positions of stops 98a and 100a shown in FIG. 11B are illustrated. In FIG. 8B pin 84 is in the same position as is illustrated in FIG. 10A. Shaft portion 68b is seated in opening lobe 94a. In this position face 84c extends into the travel path of bosses 78a, bringing ring gear 78 against the side of pin 84. As gear 78 travels in a clockwise direction, as shown in FIG. 10A, pin 84, yoke 92, and spray head base 68 all rotate about axis 40 together.

The positions of stops 98a and 100a are fixed relative to the transmission and sprayer housings. Thus, yoke 92 turns about axis 40 until ridge 92f contacts stop 98a. When it does, the continuous driving of the yoke about the axis causes the stop to force the yoke into the position shown in FIG. 8C. This in turn pivots pin 84 into the position shown in FIG. 10B. This removes face 84c from in line with bosses 78a, allowing these bosses to move past cutaway 86 without contact.

However, face 84f has now been moved toward ring gear 80 in line with the travel of bosses 80a of ring gear 80 travelling in the reverse or counterclockwise direction as viewed in FIG. 10B. Pin 84 is now driven by ring gear 80, thereby driving spray head 70 via base 68 in the same direction. When ridge 92f next contacts stop 100a, yoke 92 is again pivoted along with pin 84, and one cycle is complete. This cycle is then repeated so long as water flows through sprayer 20.

When yoke 92 switches position, it is possible for the respective face of pin 84 to abut a boss of an associated ring gear, rather than move into the space between the bosses as is illustrated in FIGS. 10A and 10B. When this happens, the pin face that previously extended in between ring gear bosses has been removed, thereby allowing both ring gears to move without moving pin 84. When the abutted boss passes pin 84, the pin pivots under the force of spring 96 acting on yoke 92, thereby inserting the previously abutting face of the pin into the space next to the abutted boss. Operation then continues as has been described.

Shaft 68b of spray head base 68 extends through a sealed bore 50a in a top plate 50b of housing 50 and a shaft 68c, an extension of shaft 68b, extends through a sealed bore 22a in top plate 22b of sprayer housing 22. Top plates 50b and 22b are spaced apart by a spacer 104 and a small cylinder 106 mounted between the top plates. The spacing allows passage of water along path 30, which enters shaft 68c through openings 108. The water then travels up out of shaft 68c and through a nozzle 110 mounted to a spray head housing 112 rotatable relative to spray housing 22, as shown.

A solid shaft 114 passes rotatably through cylinder 106 and is fixed at a lower end to adjustment gear 102. Fixed to the top of shaft 114 is an adjustment head 116 structured to receive a tool, such as a flathead screwdriver. Spray head housing 112 has in internal plate 112a with openings 118 accommodating the insertion of an adjustment tool, when a removable lid 120 is removed from the top of spray head housing 112. As discussed above, by turning adjustment head 116, the position of stop 100a relative to axis 40 can be varied to any position within the approximately 360° arc previously discussed.

It is thus seen that sprinkler 20 has a reversible spray head provided by a transmission providing drive via a ring gear and a reversing mechanism allowing part-circle oscillation. High speed reduction is provided by the compound epicyclic transmission, reducing drag on the gears and maintaining the gears in constant engagement during operation. The reversing mechanism provides positive connection between the transmission and spray head and is easily operated for shifting direction. This is all accomplished by a transmission that is relatively simple to manufacture and assemble, thereby providing reduced cost to produce and maintain.

It will be apparent to one skilled in the art that variations in form and detail may be made in the preferred embodiment without varying from the spirit and scope of the invention as defined in the claims and any modification of the claim language or meaning as provided under the doctrine of equivalents. The preferred embodiment is thus provided for purposes of explanation and illustration, but not limitation.

I claim:

1. A rotary drive sprinkler comprising:
   a sprinkler housing adapted for connection to a supply of irrigation water;

a spray head for outward projection of an irrigation water stream and supported for rotation relative to said housing;

a rotary drive assembly for rotatably driving said spray head; and a reversing mechanism including means for reversing the direction of spray head rotation within end limits of a part-circle arcuate path, said reversing mechanism including a drive member coupled to said spray head and first and second drive elements rotatably driven in opposite directions by said rotary drive assembly, and means for selectively coupling said drive member to one of said first and second drive elements for carrying said drive member in revolution coaxial with the rotation of said one drive element, and thereby, rotating said spray head in a first direction.

2. A rotary drive sprinkler according to claim I wherein said coupling means couples said drive member to the other of said first and second drive elements after said one drive element carries said drive member along a predetermined arc, for carrying said drive member in revolution coaxial with the rotation of said other drive element, and thereby rotating said spray head in a direction reverse to said first direction.

3. A rotary drive sprinkler according to claim 2 wherein said drive member extends adjacent to both said first and second drive elements and is rotatable between a first position in which said drive member engages a radial surface of said first drive element and does not engage a surface of said second drive element, and a second position in which said drive member engages a radial surface of said second drive element and does not engage a surface of said first drive element.

4. A rotary drive sprinkler according to claim 2 wherein said rotary drive assembly and said reversing mechanism each comprise gears having teeth that intermesh and said gears remain in the same configuration during rotation of said spray head in both directions.

5. A rotary drive sprinkler according to claim 1 wherein said two drive elements rotate coaxially.

6. A rotary drive sprinkler according to claim I wherein said drive member is carried in a fixed location relative to said one drive element.

7. A rotary drive sprinkler comprising:

a sprinkler housing adapted for connection to a supply of irrigation water;

a spray head for outward projection of an irrigation water Stream and supported for rotation relative to said housing;

a rotary drive assembly for rotatably driving said spray head, said rotary drive assembly including a planetary gear that revolves about a central axis and a first ring gear fixed relative to said sprinkler housing; and a reversing mechanism including means for reversing the direction of spray head rotation within the end limits of a part-circle arcuate path, said reversing mechanism including a drive member coupled to said spray head and second and third ring gears rotatably driven in opposite directions by said planetary gear, with teeth of said first, second and third gears meshing with teeth of said planetary gear, and means for selectively coupling said drive member to one of said second and third ring gears for carrying said drive member in rotation with Said one drive element, and thereby, rotating said spray head.

8. A rotary drive sprinkler according to claim 7 wherein said planetary gear has a single set of teeth that mesh concurrently with said first, second and third ring gears, and said second ring gear has fewer gear teeth than said first ring gear and said third ring gear has more gear teeth than said first ring gear.

9. A rotary drive sprinkler according to claim 8 wherein said second ring gear has one tooth less than said first ring gear and said third ring gear has one tooth more teeth than said first ring gear.

10. A rotary drive sprinkler according to claim 7 wherein said drive member is rotatable between a first position coupled to said second ring gear and a second position coupled to said third ring gear.

11. A rotary drive sprinkler according to claim 10 wherein said second and third ring gears also have respective drive surfaces for selectively engaging said drive member, and said drive member is disengaged from the drive surface of one of said second and third ring gears when said drive member is engaged by the drive surface of the other of said second and third ring gears.

12. A rotary drive sprinkler comprising:

a sprinkler housing adapted for connection to a supply of irrigation water;

a spray head for outward projection of an irrigation water stream and supported for rotation relative to said housing;

an impeller mounted relative to said housing for rotation by the flow of water in said housing;

a planetary gear coupled to said impeller for revolving about a central axis while pivoting about a planetary gear axis;

a first ring gear fixed relative to said sprinkler housing and having teeth meshing with teeth of said planetary gear;

a second ring gear rotatable about the central axis and having teeth meshing with teeth of said planetary gear, said second ring gear being drivingly coupled to said spray head for rotating said spray head about the central axis; and a third ring gear also rotatable about the central axis and having teeth meshing with teeth of said planetary gear.

13. A rotary drive sprinkler according to claim 12 wherein said planetary gear teeth comprise a single set of teeth that mesh concurrently with said first, second and third ring gears, and said second ring gear has fewer gear teeth than said first ring gear and said first ring gear has more gear teeth than said first ring gear, whereby the second and third ring gears rotate in opposite directions about the central axis.

14. A rotary drive sprinkler according to claim 13 further comprising means coupled to said spray head for selectively coupling only one of said second and third ring gears to said spray head.

15. A rotary drive sprinkler according to claim 14 wherein said coupling means comprises a drive member rotatable between a first position coupled to said second ring gear and a second position coupled to said third ring gear.

16. A rotary drive sprinkler according to claim 15 wherein said first and second ring gears also have respective drive surfaces for selectively engaging said drive member, and said drive member is disengaged from the drive surface of one of said second and third ring gears when said drive member is engaged by the drive surface of the other of said second and third ring gears.

17. A rotary drive sprinkler comprising:
a sprinkler housing adapted for connection to a supply of irrigation water;
a spray head for outward projection of an irrigation water stream and supported for rotation about a central axis relative to said housing;
an impeller mounted relative to said housing for rotation about the central axis by the flow of water in said housing;
an epicyclic gear train comprising a sun gear coupled to said impeller for rotation about the central axis, a planetary gear having a single set of teeth meshing with teeth of said sun gear for revolving about the central axis while pivoting about a revolving planetary gear axis;
a first ring gear fixed relative to said sprinkler housing and having teeth meshing with the teeth of said planetary gear;
second and third ring gears adjacent to said first ring gear rotatable about the central axis and having respective teeth meshing with said planetary gear teeth, one of said second and third ring gears having fewer teeth than said first ring gear and the other of said second and third ring gears having more teeth than said first ring gear, whereby one of said second and third ring gears rotates in one direction relative to said first ring gear, and the other of said second and third ring gears rotates in the opposite direction, said second and third ring gears each having an outer surface with at least one protrusion;
a drive pin mounted in the spray head adjacent to said outer surfaces of said second and third ring gears, said drive pin being rotatable between a first position for contacting said at least One protrusion of said second ring gear and concurrently not contacting said at least one protrusion of said third ring gear, and a second position for contacting said at least one protrusion of said third ring gear and concurrently not contacting said at least one protrusion of said second ring gear, whereby the rotational drive force of the ring gear having the contacted protrusion is transferred through the drive pin to the spray head;
a spring-biased yoke shiftable between two positions for rotating said drive pin between said first and second positions;
two stops for shifting said yoke between said two positions, at least one of said two stops being movable relative to said sprinkler housing for varying the length of the arc; and
means for manually moving said at least one stop.

* * * * *